(12) United States Patent  (10) Patent No.: US 7,941,114 B2
Hunter et al.  (45) Date of Patent: May 10, 2011

(54) NOISE MEASUREMENT FOR RADIO SQUELCH FUNCTION

(75) Inventors: Jeffrey K. Hunter, Olath, KS (US); Manuel F. Richey, Paola, KS (US)

(73) Assignee: Honeywell International Inc., Morristown, NJ (US)

( * ) Notice: Subject to any disclaimer, the term of this patent is extended or adjusted under 35 U.S.C. 154(b) by 550 days.

(21) Appl. No.: 12/167,895

(22) Filed: Jul. 3, 2008

(65) Prior Publication Data

US 2010/0003938 A1  Jan. 7, 2010

(51) Int. Cl.
*H04B 1/16* (2006.01)

(52) U.S. Cl. ........................ 455/224; 455/226.1; 455/225

(58) Field of Classification Search .................. 455/218, 455/219, 220, 221, 222, 224, 225, 226.1
See application file for complete search history.

(56) References Cited

U.S. PATENT DOCUMENTS

| | | | | |
|---|---|---|---|---|
| 3,934,206 A | * | 1/1976 | Holecek | 455/220 |
| 4,044,309 A | * | 8/1977 | Smith | 455/221 |
| 4,371,981 A | | 2/1983 | King et al. | |
| 4,388,731 A | * | 6/1983 | King | 455/221 |
| 4,414,689 A | * | 11/1983 | Enderson | 455/221 |
| 4,607,390 A | * | 8/1986 | Faugeron | 455/143 |
| 5,465,404 A | * | 11/1995 | Retzer et al. | 455/220 |
| 5,564,090 A | * | 10/1996 | Beauchamp et al. | 455/220 |
| 5,701,598 A | * | 12/1997 | Atkinson | 455/161.2 |
| 5,721,754 A | * | 2/1998 | Chen | 375/227 |
| 6,374,095 B1 | * | 4/2002 | Doyle et al. | 455/218 |
| 6,493,450 B1 | * | 12/2002 | Scheuer et al. | 381/57 |
| 6,671,504 B1 | | 12/2003 | Myers et al. | |
| 7,295,813 B2 | * | 11/2007 | Haub et al. | 455/67.13 |

* cited by examiner

*Primary Examiner* — Blane J Jackson
(74) *Attorney, Agent, or Firm* — Fogg & Powers LLC

(57) ABSTRACT

A method implementable in an audio receiver having an input for receiving broadcast signals including a set of channels and a squelching controller includes converting the signals associated with each channel into respective digital signals, and tuning the digital signals associated with a first subset of the channels. For each channel of the first channel subset, a respective set of amplitudes associated with respective frequencies of the associated digital signal is determined. A random-noise-level value associated with each channel of the first channel subset is determined from each set of the signal amplitudes. If a signal amplitude associated with a first channel of the first channel subset exceeds the random-noise-level of the first channel, a second subset of the channels of the set is tuned. Otherwise, the random-noise-levels are provided to the squelching controller.

18 Claims, 4 Drawing Sheets

NOISE MEASUREMENT FOR RADIO SQUELCH FUNCTION

BACKGROUND OF THE INVENTION

Present avionics communication signal-to-noise squelches are handicapped by the manner in which they measure the noise portion of the ratio. Noise is measured slightly off channel so that the desired on-channel signal power does not interfere with the noise power that must be measured. A traditional receiver contains a hardware-implemented intermediate-frequency (IF) filter that is usually in the form of a high-Q crystal filter or some other high-Q circuit design to give the radio as steep an out-of-band cut off as possible. This IF filter has the undesirable effect of filtering off a portion of the noise that is being measured. The IF filter response can also vary with temperature, thus affecting noise measurement and squelch function. The effect of the IF filter is that the squelch does not always perform predictably, and suffers from the reduced and varying level of the noise being measured.

SUMMARY OF THE INVENTION

In an embodiment, a method implementable in an audio receiver having an input for receiving broadcast signals including a set of channels and a squelching controller includes converting the signals associated with each channel into respective digital signals, and tuning the digital signals associated with a first subset of the channels. For each channel of the first channel subset, a respective set of amplitudes associated with respective frequencies of the associated digital signal is determined. A random-noise-level value associated with each channel of the first channel subset is determined from each set of the signal amplitudes. If a signal amplitude associated with a first channel of the first channel subset exceeds the random-noise-level of the first channel, a second subset of the channels of the set is tuned. Otherwise, the random-noise-levels are provided to the squelching controller.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
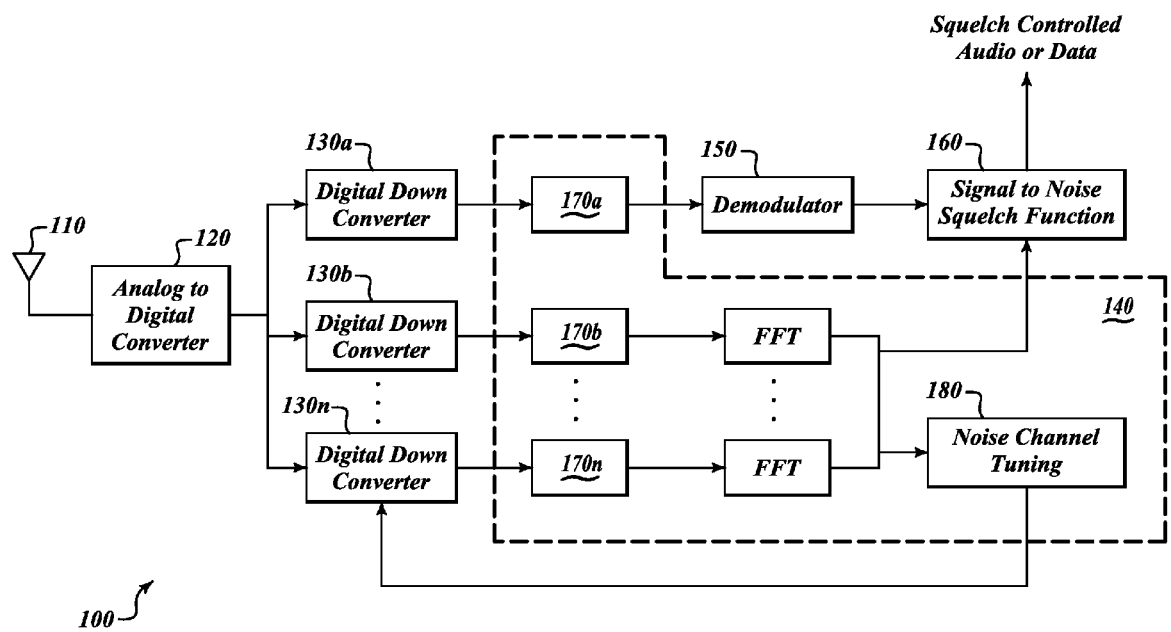
FIG. 1 is a functional block diagram of an audio receiver according to an embodiment of the invention.

An embodiment of the invention implements a squelch mechanism for a wideband digital radio receiver. Such mechanism uses out-of-band noise measurements in different radio channels other than the main tuned channel to make squelching decisions.

An embodiment of the invention does not require or otherwise utilize hardware-implemented IF filters. None of the off-channel noise is reduced in level in any way prior to being digitally sampled. In a broadband sampling receiver according to an embodiment, IF filter responses may be achieved through digital-signal processing (DSP). Additionally, in a receiver according to an embodiment, multiple simultaneous receive channels can digitally process the same digitally sampled data stream. As such, one receive channel can be devoted to desired-signal-channel demodulation with appropriate DSP-derived IF filtering. A separate receive channel, or channels, can be used to measure noise power. These noise channels can have any arbitrary bandwidth or frequency offset from the desired channel so that the noise in the signal-to-noise calculation is measured most accurately.

Furthermore, an embodiment, described in further detail below with reference to FIGS. 3-4, includes and/or enables methods by which the noise-channel-measuring receiver offset or offsets may be determined. During radio operation, it is not possible to predict which frequency offsets from the desired channel may actually contain signals that are not random noise. These non-random noise signals must be avoided for proper signal-to-noise squelch operation. One method of avoiding this problem according to an embodiment is to periodically perform a full-band fast Fourier transform (FFT) or discrete Fourier transform (DFT). Full-band here refers to the entire digitally sampled frequency range and may include frequencies inside as well as outside a particular band of interest (avionics communications band, for example). The FFT calculates the amount of energy within each frequency bin. The result of the FFT can be used to ascertain which offset frequencies may be used to accurately measure noise power. Those frequency bins that contain a greater-than-normal amount of energy are not used in the squelch function because they may contain non-random noise (e.g., a carrier signal); random-noise energy within bins should remain constant across all bins that contain only random noise.

An alternative-embodiment, described in further detail below with reference to FIGS. 1-2, includes and/or enables methods of determining if a frequency bin contains only random noise. Such a method does not require a full-band FFT. An FFT may be performed within a noise channel bandwidth only. The FFT bins can be checked to see if they contain equivalent amounts of energy. Random noise only within the noise-measurement channel will be flat. If there is a non-random signal in the channel, it will show up as one or more frequency bins containing greater energy than the bins containing random noise only. Two or more noise channels can also be simultaneously monitored so that their relative levels could be compared to increase robustness of the noise measurement.

Embodiments of the invention may be described in the general context of, or may otherwise include, computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments. Moreover, the functionality of the program modules may be implemented in software, hardware, firmware, and/or various combinations of same.

FIG. 1 is a functional block diagram of an audio receiver 100 according to an embodiment of the invention. The audio receiver 100 includes a signal input, such as an antenna 110 or an interface (not shown) coupled to an antenna, an A/D converter 120, a set of digital down converters 130A-N disposed in parallel, a processing device 140 (as denoted by the dashed box), a demodulator 150, and a squelching controller 160. The processing device 140 includes a set of digital-signalprocessing (DSP) modules 170A-N in communication with the down converters 130A-N and a noise-channel-tuning module 180. Although only three down converters 130A-N and DSP modules 170A-N are illustrated, embodiments of the invention may include more or fewer such down converters and DSP modules. Although the tuning module 180 is shown as executed by the processing device 140, the module 180 may alternatively be executed by a device (not shown) other than the processing device 140. Additionally, the functionality of the demodulator 150 and squelching controller 160 may be implemented in the processing device 140.

In operation, the antenna 110 receives broadcast signals comprising a set of channels, each channel having a predetermined frequency bandwidth. The broadcast signals may include the known avionics communication band in the 118 to 137 MHz frequency range. The converter 120 converts the signals associated with each channel into respective digital signals. The down converters 130 tune or otherwise filter the digital signals at respective predetermined frequencies. Down converter 130A tunes a broadcast signal at a frequency desired by a user of the receiver 100, after which the desired broadcast signal is processed by DSP module 170A and demodulator 150, and provided to squelching controller 160. Down converters 130B-N tune off-channel (noise) frequencies.

Figure 2:
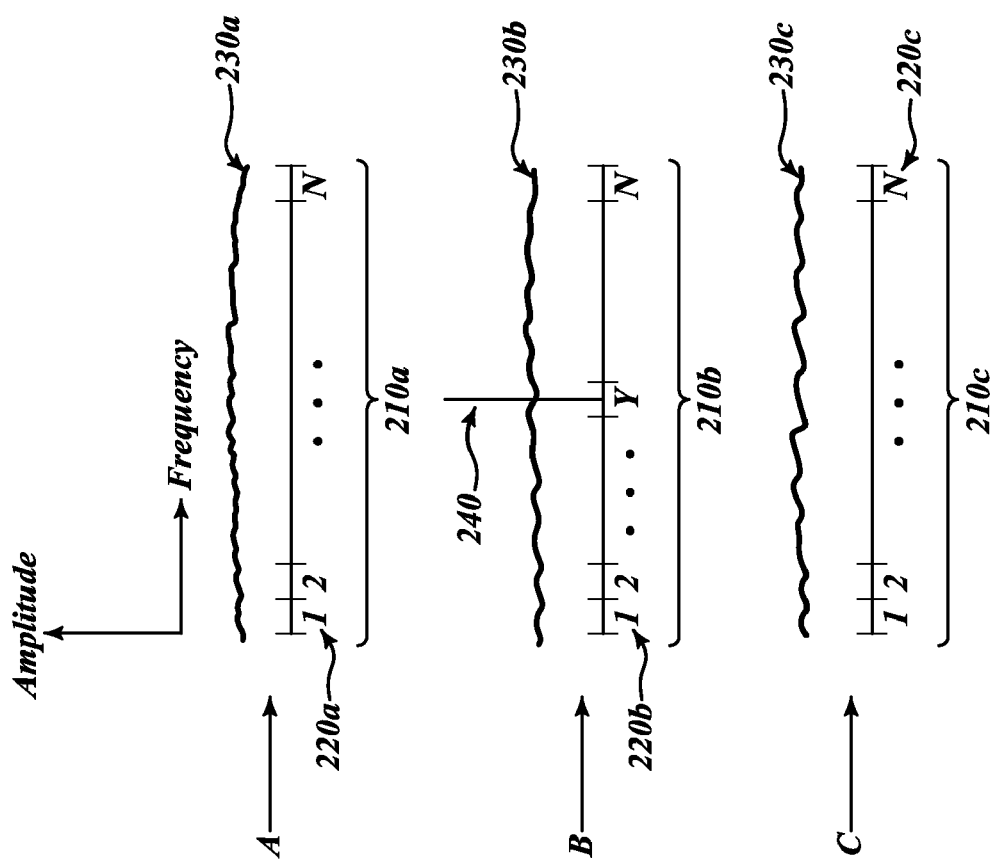
FIG. 2 is a schematic diagram illustrating signal analysis according to an embodiment of the present invention.

Referring to FIG. 2, the processing device 140 applies an FFT, for example, to determine signal-energy amplitudes associated with frequency bins within each noise channel included in a random or predetermined first subset of the noise channels available for sampling from the broadcast signals received by the antenna 110. In the example illustrated in FIG. 2, down converter 130B is tuned to noise channel A, down converter 130C (not shown) is tuned to noise channel B, and down converter 130D (not shown) is tuned to noise channel C. As illustrated, each of noise channels A-C includes a respective spectrum 210A-C of a predetermined number of frequency bins 220A-C. The widths of each spectrum and frequency bin may likewise be predetermined.

Subsequently, the processing device 140 can determine from the signal amplitudes a random-noise-level value respectively associated with each channel of the first channel subset. As illustrated in FIG. 2, for each channel A-C, the FFT yields a determination of the presence of respective random noise signals 230A-C. However, the FFT further yields a determination of the presence of a non-random signal 240 associated with bin "y" in channel B. Consequently, the tuning module 180 will cause down converter 130C to tune a noise channel other than noise channel B. As such, the down converters 130B-D are made to tune a second subset of channels different from the first subset in an attempt to accurately measure noise power. This process may be repeated, as needed, until an accurate determination of noise power is achieved. Additionally, while the use of multiple down converters to simultaneously analyze multiple noise channels is illustrated and described with reference to FIG. 2, more or fewer such down converters and noise channels may be utilized in other embodiments.

In the example illustrated in FIG. 2, if a non-random signal was not detected in channel B, then the processing device 140 would provide the random-noise-levels 230A-C to the squelching controller 160 for use in the signal-to-noise determination.

Figure 3:
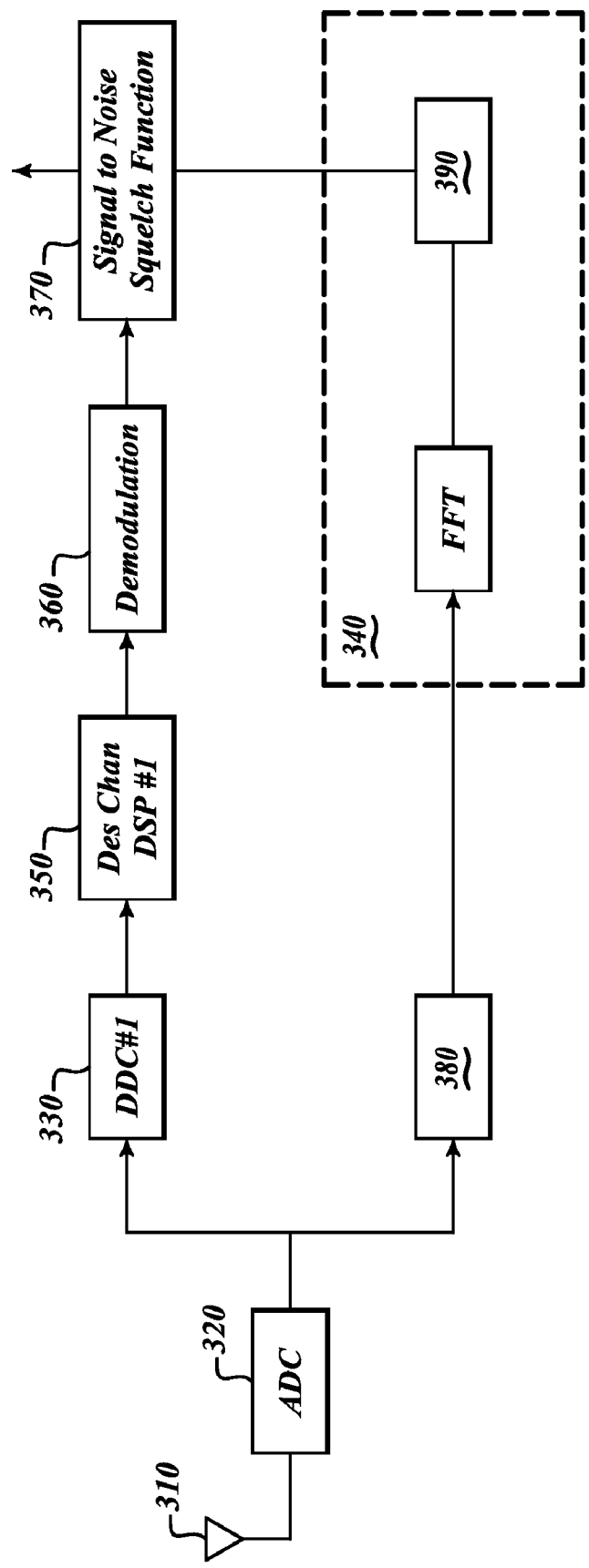
FIG. 3 is a functional block diagram of an audio receiver according to an alternative embodiment of the invention.

FIG. 3 is a functional block diagram of an audio receiver 300 according to an alternative embodiment of the invention. The audio receiver 300 includes a signal input, such as an antenna 310 or an interface (not shown) coupled to an antenna, an A/D converter 320, a digital down converter 330, a processing device 340 (as denoted by the dashed box), a DSP module 350, a demodulator 360, and a squelching controller 370. The processing device 340 can include, or otherwise be coupled to, a memory, such as storage device 380, in communication with the converter 320 and a bin-selection module 390. Additionally, the functionality of the DSP module 350, demodulator 360, and squelching controller 370 may be implemented in the processing device 340.

In operation, the antenna 310 receives broadcast signals comprising a set of channels, each channel having a predetermined frequency bandwidth. The broadcast signals may include the known avionics communication band in the 118 to 137 MHz frequency range. The converter 320 converts the signals received during a first time interval and associated with each channel into respective digital channel-data sets. Down converter 330 tunes a broadcast signal at a frequency desired by a user of the receiver 300, after which the desired broadcast signal is processed by DSP module 350 and demodulator 360, and provided to squelching controller 370. Processing device 340 receives the digital-data sets associated with off-channel (noise) frequencies and may store same in storage device 380.

Figure 4:
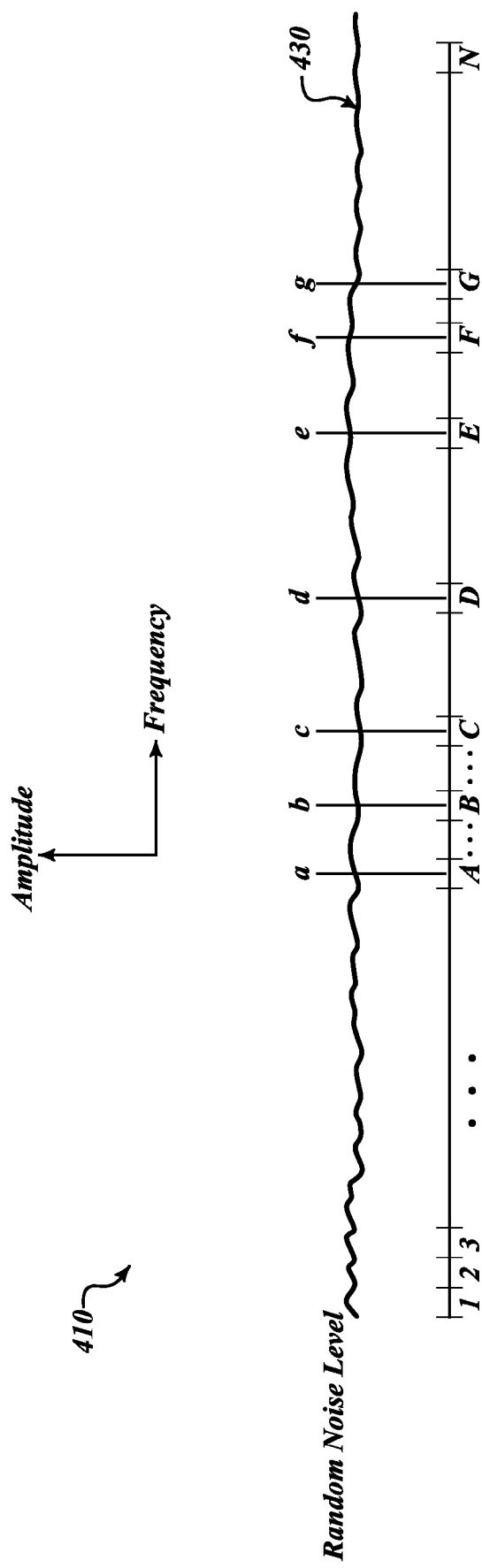
FIG. 4 is a schematic diagram illustrating signal analysis according to an alternative embodiment of the present invention.

Referring to FIG. 4, the processing device 340 applies an FFT, for example, to determine signal-energy amplitudes associated with noise channels and/or frequency bins within all of the noise channels available for sampling from the broadcast signals received by the antenna 310. FIG. 4 illustrates the spectrum 410 of the frequency bins associated with all channels received by the antenna 310. The width of each frequency bin may be predetermined.

Subsequently, the processing device 340 can determine from the signal amplitudes a random-noise-level value associated with the spectrum 410. The processing device 340 may do this by examining a predetermined number of bins until able to discern a noise floor (i.e., minimum noise signal). As illustrated in FIG. 4, the FFT-yielded spectrum 410 enables the selection module 390 to examine all or some of the bins to determine the random noise level 430. In determining the noise level, the selection module 390 discards bins, such as bins A, C, D and E illustrated in FIG. 4, that contain signals that exceed the established noise floor. The processing device 340 may then provide the random-noise-levels to the squelching controller 370 for use in the signal-to-noise determination.

In an alternative embodiment, the receiver 100 illustrated in FIG. 1 may provide functionality similar to that described above with reference to FIGS. 3 and 4. FIG. 1 is inherently able to do continuous monitoring, whereas FIG. 3 takes "snapshots" of the band. A snapshot may miss a short interfering transmission. Receiver 100 supports the ability to monitor multiple bandwidths. Frequency-bin widths may be changed by changing the FFT sample size. For example, in operation, the antenna 110 receives broadcast signals comprising a set of channels, each channel having a predetermined frequency bandwidth. The broadcast signals may include the known avionics communication band in the 118 to 137 MHz frequency range. The converter 120 converts the signals associated with each channel into respective digital signals. The down converters 130 tune or otherwise filter the digital signals at respective predetermined frequencies. Down converter 130A tunes a broadcast signal at a frequency desired by a user of the receiver 100, after which the desired broadcast signal is processed by DSP module 170A and demodulator 150, and provided to squelching controller 160. Down converters 130B-N tune off-channel (noise) frequencies.

Referring to FIG. 4, the processing device 140 applies an FFT, for example, to determine signal-energy amplitudes associated with noise channels and/or frequency bins within all of the noise channels available for sampling from the broadcast signals received by the antenna 110. FIG. 4 illustrates the spectrum 410 of the frequency bins associated with all channels received by the antenna 110. The width of each frequency bin may be predetermined.

Subsequently, the processing device 140 can determine from the signal amplitudes a random-noise-level value associated with the spectrum 410. The processing device 140 may do this by examining a predetermined number of bins until able to discern a noise floor (i.e., minimum noise signal). As illustrated in FIG. 4, the FFT-yielded spectrum 410 enables the tuning module 180 to examine all or some of the bins to determine the random noise level 430. In determining the noise level, the tuning module 180 discards bins, such as bins A, C, D and E illustrated in FIG. 4, that contain signals that exceed the established noise floor. The processing device 140 may then provide the random-noise-levels to the squelching controller 160 for use in the signal-to-noise determination.

While a preferred embodiment of the invention has been illustrated and described, as noted above, many changes can be made without departing from the spirit and scope of the invention. Accordingly, the scope of the invention is not limited by the the preferred embodiment. Instead, the invention should be determined entirely to the claims that follow.

The embodiments of the invention in which an exclusive property or privilege is claimed are defined as follows:

1. A method implementable in an audio receiver having an input for receiving broadcast signals comprising a set of channels, each said channel having a predetermined frequency bandwidth, and a squelching controller for facilitating a squelch-controlled audio output, the method comprising:
   converting the signals received during a first time interval and associated with each channel of the set into respective digital channel-data sets;
   for each channel of the channel set, determining from the digital channel-data sets an associated signal amplitude;
   determining from a set of the signal amplitudes a random-noise-level value; and
   providing the random-noise-level value to the squelching controller.

2. The method of claim 1, further comprising storing the digital channel-data sets prior to determining the signal amplitudes.

3. The method of claim 1 wherein the signal-amplitudes of the set correspond to a subset of the channels of the channel set, the channel subset being smaller than the channel set.

4. The method of claim 1 wherein determining the signal amplitudes comprises applying a fast Fourier transform to the digital channel-data sets.

5. The method of claim 1 wherein determining the signal amplitudes comprises applying a discrete Fourier transform to the digital channel-data sets.

6. The method of claim 1 wherein the set of channels comprises at least 2280 channels.

7. A method implementable in an audio receiver having an input for receiving broadcast signals comprising a set of channels, each said channel having a predetermined frequency bandwidth, and a squelching controller for facilitating a squelch-controlled audio output, the method comprising:
   converting the signals associated with each channel of the set into respective digital signals;
   tuning the digital signals associated with a first subset of the channels of the set;
   for each channel of the first channel subset, determining a respective set of amplitudes associated with respective frequencies of the associated digital signal;
   determining from each set of the signal amplitudes a random-noise-level value respectively associated with each channel of the first channel subset;
   if a signal amplitude associated with a first channel of the first channel subset exceeds the random-noise-level associated with the first channel, tuning a second subset of the channels of the set, the second subset being different from the first subset; and
   if no signal amplitude associated with a respective channel of the first channel subset exceeds the random-noise-level associated with the respective channel, providing the random-noise-levels to the squelching controller.

8. The method of claim 7 wherein the second subset includes the channels of the first subset other than the first channel.

9. The method of claim 7 wherein determining the amplitudes comprises applying a fast Fourier transform to the tuned digital signals.

10. The method of claim 7 wherein determining the amplitudes comprises applying a discrete Fourier transform to the tuned digital signals.

11. The method of claim 7 wherein the first subset includes only one channel.

12. An audio receiver, comprising:
   an input for receiving broadcast signals comprising a set of channels, each said channel having a predetermined frequency bandwidth;
   a squelching controller for facilitating a squelch-controlled audio output;
   a converter coupled to the input and configured to convert the signals associated with each channel of the set into respective digital signals;
   a plurality of tuning devices coupled to the converter and configured to tune the digital signals associated with a first subset of the channels of the set; and
   a processing device coupled to the tuning devices and configured to:
      determine, for each channel of the first channel subset, a respective set of amplitudes associated with respective frequencies of the associated digital signal,
      determine from each set of the signal amplitudes a random-noise-level value respectively associated with each channel of the first channel subset,
      if a signal amplitude associated with a first channel of the first channel subset exceeds the random-noise-level associated with the first channel, cause the tuning devices to tune a second subset of the channels of the set, the second subset being different from the first subset, and
      if no signal amplitude associated with a respective channel of the first channel subset exceeds the random-noise-level associated with the respective channel, provide the random-noise-levels to the squelching controller.

13. The receiver of claim 12 wherein the second subset includes the channels of the first subset other than the first channel.

14. The receiver of claim 12 wherein the amplitudes are determined by applying a fast Fourier transform to the tuned digital signals.

15. The receiver of claim 12 wherein the amplitudes are determined by applying a discrete Fourier transform to the tuned digital signals.

16. The receiver of claim 12 wherein the tuning devices comprise at least one digital down converter.

17. The receiver of claim 12 wherein the first subset includes only one channel.

18. A method implementable in an audio receiver having an input for receiving broadcast signals comprising a set of channels, each said channel having a predetermined frequency bandwidth, and a squelching controller for facilitating a squelch-controlled audio output, the method comprising:

converting the signals associated with each channel of the set into respective digital signals;

for each channel of the channel set, determining from the digital signals an associated signal amplitude;

determining from a set of the signal amplitudes a random-noise-level value; and providing the random-noise-level value to the squelching controller.

* * * * *